United States Patent [19]

Takeda

[11] Patent Number: 4,538,556
[45] Date of Patent: Sep. 3, 1985

[54] AIR INTAKE DEVICE OF AN INTERNAL COMBUSTION ENGINE

[75] Inventor: Keiso Takeda, Susono, Japan

[73] Assignee: Toyota Jidosha Kabushiki Kaisha, Toyota, Japan

[21] Appl. No.: 604,306

[22] Filed: Apr. 26, 1984

[30] Foreign Application Priority Data

Jul. 11, 1983 [JP] Japan ................................ 58-124820
Aug. 24, 1983 [JP] Japan ................................ 58-153019

[51] Int. Cl.³ .............................................. F02B 75/18
[52] U.S. Cl. .............................................. 123/52 MB
[58] Field of Search ........................ 123/52 M, 52 MB

[56] References Cited

U.S. PATENT DOCUMENTS

| 3,814,069 | 6/1974 | Croft et al. | 123/52 M |
| 4,231,329 | 11/1980 | Ishida | 123/52 MB |
| 4,300,504 | 11/1981 | Tezuka | 123/52 M |
| 4,402,297 | 9/1983 | Hyodo et al. | 123/52 MB |
| 4,457,267 | 7/1984 | Gorr | 123/52 MB |

FOREIGN PATENT DOCUMENTS

| 891339 | 9/1953 | Fed. Rep. of Germany | 123/52 MB |
| 47-43374 | 11/1972 | Japan. | |
| 0087821 | 7/1980 | Japan | 123/52 MB |

*Primary Examiner*—Craig R. Feinberg
*Attorney, Agent, or Firm*—Kenyon & Kenyon

[57] ABSTRACT

An air intake device of an internal combustion engine having an intake passage comprises a tank which extends along the intake passage. A first pipe interconnects the tank with the intake passage and a valve disposed therein is actuated in response to the engine speed for improving the engine performance. A narrow second pipe also interconnects the tank with the intake passage and constitutes a resonator in conjunction with the tank. The second pipe opens into the intake passage upstream of a throttle valve and preferably close to an air cleaner mounted on the upstream end of the intake passage.

7 Claims, 6 Drawing Figures

AIR INTAKE DEVICE OF AN INTERNAL COMBUSTION ENGINE

BACKGROUND OF THE INVENTION

1. Field of the Invention

The present invention relates to an air intake device of an internal combustion engine.

2. Description of the Prior Arts

An air intake device of an internal combustion engine that utilizes the dynamic effects of the air flow to improve the volumetric efficiency of the engine is known, for example, from Japanese Examined Patent Publication No. 47-43374 issued on Nov. 2, 1972 and Japanese Unexamined Patent Publication No. 55-87821. This known device comprises a tank providing a volumetric area extending along an intake tube, a valve disposed in an interconnecting portion between the tank and the intake passage, and valve activating means to open or shut the valve in response to the engine load. This arrangement makes it possible to enhance engine perfomance.

Analysis of the effect of such a device has determined that an air inlet pipe placed upstream of an air cleaner should be as short as possible, to obtain the most enhanced dynamic effect. However, it has been also determined that there is an increase in the noise from the air intake if the inlet pipe upstream of the air cleaner is cut too short.

SUMMARY OF THE INVENTION

It is an object of the present invention to provide an air intake device of an internal combustion engine that will improve the performance of the engine by the best utilization of the dynamic effect, to reduce noise from the air intake.

According to the present invention, an intake device for an internal combustion engine having an air intake passage extending from an air cleaner to an intake manifold comprises a tank defining a volume, a first pipe defining a first passage interconnecting the tank with the air intake passage, and a second pipe defining a second passage interconnecting the tank with the air intake passage. The first and second passages are open to the intake passage at different locations with respect to each other, and the cross-sectional area of the second passage is smaller than that of the first passage.

A valve is disposed in the first passage together with a valve actuating means responsive to an engine operating condition.

Preferably, the cross-sectional area of the first passage is equal to or larger than that of the intake passage, and the cross-sectional area of the second passage is substantially equal to or smaller than about one-tenth that of the first passage. The second passage preferably opens to the air intake passage at a location nearer the air cleaner than the location where the first passage opens to the air intake passage.

BRIEF DESCRIPTION OF THE DRAWINGS

The present invention will be more fully understood from the following description of the preferred embodiment, with reference to the attached drawings, wherein.

DESCRIPTION OF THE PREFERRED EMBODIMENT

Figure 1:
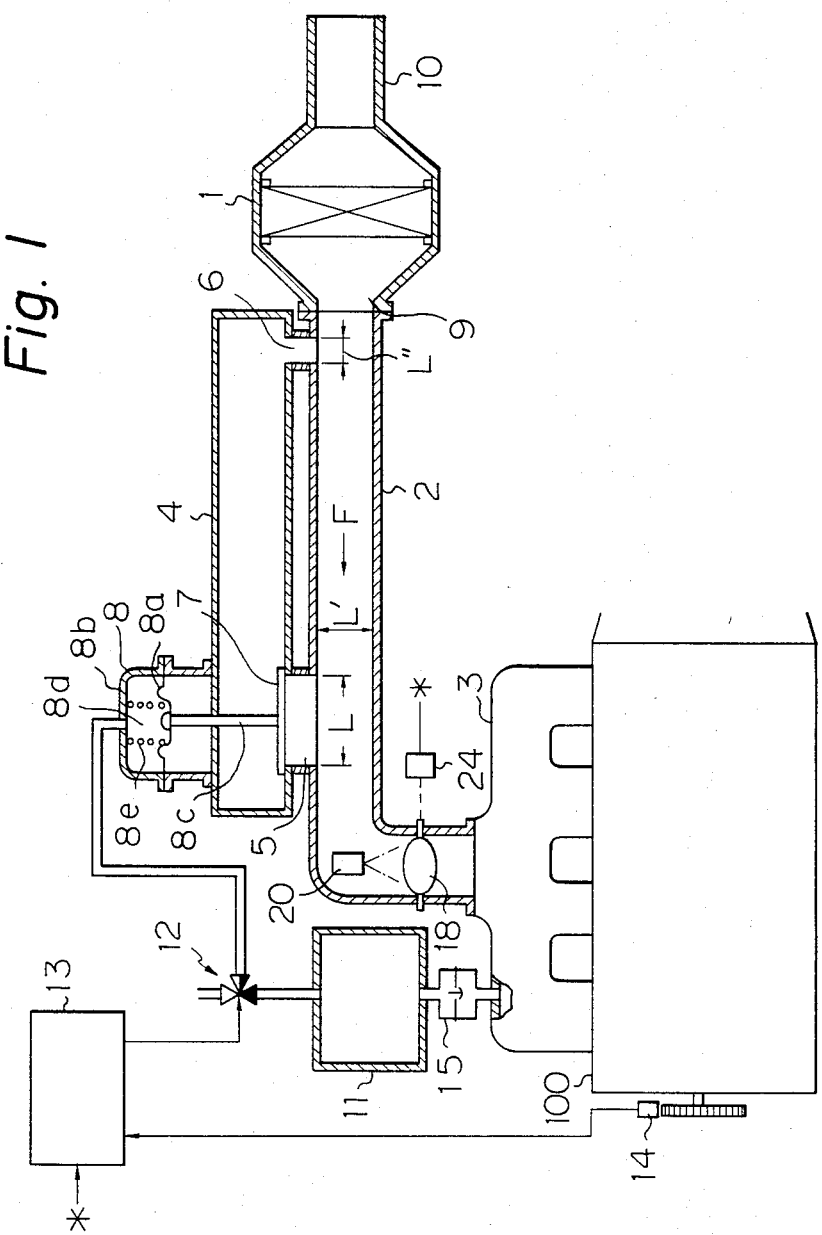
FIG. 1 is a schematic sectional view of an air intake device of an internal combustion engine according to the present invention.

In FIG. 1, an air cleaner 1, an intake tube or pipe 2, and an intake manifold 3 are connected in series and constitute a conventional air intake passage wherein the air flows in the direction indicated by the arrow F to an engine 100.

According to the present invention, a tank 4 providing a constant volume is extended along the intake pipe 2. The tank 4 and the intake pipe 2 are interconnected by two pipes 5 and 6. The cross-sectional area of the pipe 5 (represented by the diameter L) is substantially equal to or larger than that of the intake pipe 2 (represented by the diameter L'). The pipe 6 is located upstream of the pipe 5, i.e., is connected between the tank 4 and the intake pipe 2 at a position nearer the air cleaner 1 than a position where the pipe 5 opens to the intake pipe 2, and has a smaller cross-sectional area (represented by the diameter L") than the pipe 5. The ratio of the cross-sectional area between both pipes 5 and 6 is preferably about one tenth, wherein the diameter L of the pipe 5 is about 60 mm and the diameter L" of the pipe 6 is about 20 mm. These two pipes 5 and 6 define air passages between the tank 4 and intake pipe 2, respectively.

A control valve 7 is disposed at the tank-side opening of the passage defined by pipe 5, this valve 7 being actuated by an actuator 8 comprising a vacuum diaphragm actuator, wherein the actuator 8 has a diaphragm 8a mounted in a casing 8b. The valve 7 is fixed to the diaphragm 8a by a valve rod 8c. The apparatus has a vacuum chamber 8d defined by the diaphragm 8a and the casing 8b. A compressed spring 8e urges the diaphragm 8a in the direction toward which the valve 7 is closed. When a vacuum is introduced into the vacuum chamber 8d, it causes the valve 7 to open against the spring 8e. The vacuum is supplied from a vacuum tank 11 through a solenoid valve 12, which is controlled by a controller 13. The controller 13 produces a control signal for the solenoid valve 12, based on an input representing the engine load conditon, such input being delivered by, for example, an engine speed sensor 14 and a throttle position sensor 24. The solenoid valve 12 allows the vacuum chamber 8d to communicate with the vacuum tank 11 when the valve 7 is to be opened, and allows the vacuum chamber 8d to connect to the atmosphere when the valve 7 is to be closed. The vacuum tank 11 can be connected to the intake manifold 3, as a vacuum source, through a check valve 15. A throttle valve 18 is located in the intake pipe 2 near the intake manifold 3. The fuel supply means can be of any conventional type. In the preferred embodiment, a fuel injector 20, a so-called unit injector type, is arranged in the intake pipe 2 between the throttle valve 18 and the opening of the pipe 5.

Figure 2:
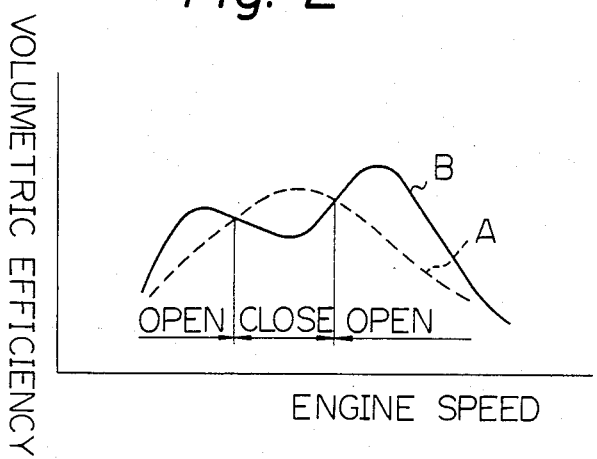
FIG. 2 is a graph illustrating volumetric efficiency curves with respect to the engine speed.

FIG. 2 shows two typical volumetric efficency curves A and B with respect to the engine speed. It will be understood by a person skilled in the art that a volumetric curve such as that shown by A or B changes in accordance with the effective pipe length between a convergent end 9 of the air cleaner 1 (through intake pipe 2) and the intake manifold 3, depending on a specific engine design, because the volume of the tank 4 and of the passage in the pipe 5 serves to change the effective length of the intake pipe 2.

Curve A is a typical representation of the volumetric efficiency when the valve 7 is closed, whereas curve B is a typical representation of the volumetric efficiency when the valve 7 is opened. Thus, it will be understood that the engine performance is improved if the control valve 7 is controlled as indicated in FIG. 2 to create a new compound curve comprising each peak portion of the curves A and B.

As mentioned previously, such features can be best attained by decreasing the length of an air inlet pipe or nose 10 placed upstream of the air cleaner. The length from the open end of the pipe 10 to the air cleaner is preferably 10 cm. However, this results in an increase in the air intake noise. An object of the present invention is to decrease this noise while improving the engine performance.

Figure 3:
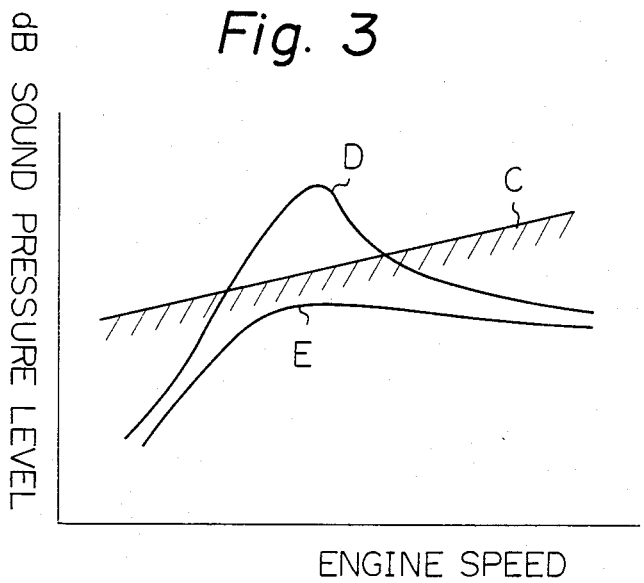
FIG. 3 is a graph illustrating sound pressure level curves with respect to the engine speed.

FIG. 3 shows curves representing the sound pressure level of the intake noise with respect to the engine speed. As shown by the curve D, the noise is increased when the valve 7 is closed, since the noise is absorbed by the volume of the tank 4 to some extent when the valve 7 is open. This noise can be reduced to the level indicated by the curve E, i.e., within the permissable level C, by the provision of the narrow passage of the pipe 6. As is apparent, the volume of the tank 4 and the narrow passage of the pipe 6 constitute a resonator which absorbs the noise. The resonator effect can be determined by the relationship given in the following equation, $$f = \frac{c}{2\pi} \sqrt{S/lV}$$

where, f = frequency of the intake noise, c = speed of the sound, s = cross-sectional area of the passage in the pipe 6, l = length of the passage in the pipe 6, V = volume of the tank 4.

It is obvious that the provision of the narrow pipe 6 interconnecting the tank 4 with the intake pipe 2 constitutes a resonator rather than a device to influence the dynamic efficiency, if the cross-sectional area of the passage in the pipe 6 is smaller than that of the pipe 5. However, the provision of the narrow passage in the pipe 6 may have an influence on the dynamic effect, to a small extent, depending on the size of the pipe 6. For this reason, it is preferable to locate the pipe 6 at a position adjacent to, or as near as possible to, the air cleaner 1.

Figure 4:
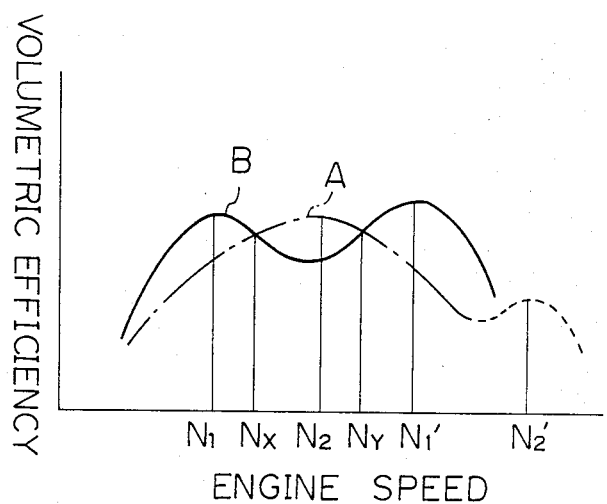
FIG. 4 is a graph similar to FIG. 2 for further illustrating the valve operation.
Figure 5:
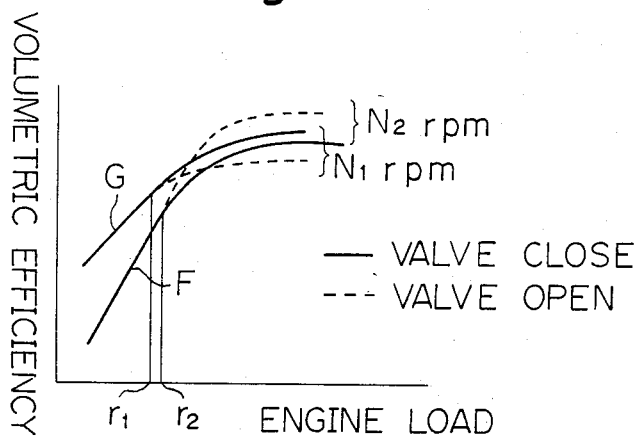
FIG. 5 is a graph of the volumetric efficiency curves with respect to the engine load.
Figure 6:
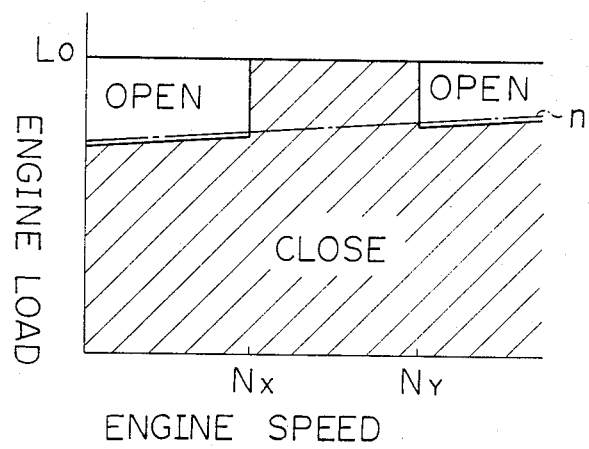
FIG. 6 is a graph illustrating the region where the valve is operated.

The operation of the valve 7 is now further described. FIG. 4 shows similar volumetric efficiency curves A and B to those of FIG. 2. Curve B has two peaks at engine speeds $N_1$ and $N'_1$ within an accessible engine operating range for a conventional car. Curve A has a peak at engine speed $N_2$ between the speeds $N_1$ and $N'_1$, and a further peak at engine speed $N'_2$, which does not appear within the accessible engine operating range in this embodiment. The valve 7 is turned to open or to close, as shown in FIG. 2, at engine speed $N_X$ and $N_Y$ where the two curves A and B intersect. These characters $N_1$, $N'_1$, $N_2$, $N_X$, and $N_Y$ are used in a similar sense in FIGS. 5 and 6. Note the characteristic of curves A and B is best obtained when the engine load is maintained at a constant value, near to its full load, and the curve B becomes closer to curve A when the load changes. This feature is explained in reference to FIG. 5, which shows curves F and G with respect to the engine load when the engine speed is constant at $N_1$ and $N_2$, respectively. The solid line shows when the valve 7 is closed and the broken line shows when the valve 7 is opened. It will be seen that the difference between the solid line and the broken line becomes smaller as the engine load becomes smaller, and, such difference becomes substantially zero below a load $r_1$ or $r_2$. Such points as $N_1$ to $r_1$ and $N_2$ to $r_2$ are plotted to make a line n in FIG. 6. It will thus be understood that the valve 7 is preferably closed at any engine speed when the load is below the line n. When the load is above the line n, the valve 7 is operated in a manner as shown in FIG. 2. More preferably, the valve 7 is opened only in the region where the load is above the line n and the speed is above $N_Y$, since the lefthand opening zone rarely appears in actual engine operations. These valve operating conditions can be stored as a map in the control circuit 13 in FIG. 1, which produces a control signal for the solenoid valve 12 and thus the control valve 7, based on the engine speed sensor 14 and the throttle position sensor 24. It will be apparent to those skilled in the art that the engine load is often detected by the position of the throttle valve 18. The load can be also detected by other means, for example, the vacuum level in the intake manifold 3.

I claim:

1. An air intake device of an internal combustion engine having an air intake passage extending from an air cleaner to an intake manifold, comprising:
   tank means having a predetermined volume;
   first pipe means defining a first passage interconnecting said tank means at one end of said tank means with said intake passage;
   second pipe means defining a second passage interconnecting said tank means at an end opposite said one end of said tank means with said intake passage, said second passage opening to said intake passage at a first location nearer to said air cleaner than a second location where said first pipe means opens to said intake passage, said second passage having a cross-sectional area being smaller than that of said first passage;
   valve means disposed in said first passage;
   means for actuating said valve means in response to an engine operating condition;
   a throttle valve disposed in said intake passage downstream of said second location at a third location nearer to said intake manifold than said first passage; and
   a fuel injector disposed in said intake passage at a position between said second and third locations.

2. An air intake device of an internal combustion engine having an air intake passage extending from an air cleaner to an intake manifold and a throttle valve in said intake passage, the device comprising:
   tank means having a predetermined volume;
   first pipe means defining a first passage interconnecting said tank means at one end of said tank means with said intake passage;
   second pipe means defining a second passage interconnecting said tank means at an end opposite said one end of said tank means with said intake passage, said first and second passages opening to said intake passage at different locations with respect to each other, the locations of these openings being upstream of the throttle valve with the second passage opening being located nearer to said air cleaner than the first passage opening, and said; second passage having a cross-sectional area being smaller than that of said first passage;

valve means disposed in said first passage; and means for actuating said valve means in response to an engine operating condition.

3. An intake device according to claim 2, wherein the cross-sectional area of said first passage is at least equal to that of said intake passage, and the cross-sectional area of said second passage is at least substantially equal to about one-tenth of the cross-sectional area of said first passage.

4. An intake device according to claim 2, wherein the second passage opens to said intake passage adjacent to said air cleaner.

5. An intake device according to claim 2, wherein said engine operating condition is engine speed.

6. An intake device according to claim 5, wherein said intake device provides a first volumetric efficiency curve having a peak at a predetermined first engine speed when said valve means is closed and a second volumetric efficiency curve having a peak at a predetermined second engine speed above said first engine speed when said valve means is opened.

7. An intake device according to claim 6, wherein said valve means is opened when the engine speed is above said second speed and the engine load is above a predetermined engine load.

* * * * *